UNITED STATES PATENT OFFICE.

JOHN H. DOLDE, OF ST. LOUIS, MISSOURI.

IMPROVEMENT IN EXPLOSIVE COMPOUNDS.

Specification forming part of Letters Patent No. 150,543, dated May 5, 1874; application filed April 27, 1874.

*To all whom it may concern:*

Be it known that I, JOHN H. DOLDE, of St. Louis, in the county of St. Louis and in the State of Missouri, have invented certain new and useful Improvements in Compound for Gunpowder; and do hereby declare that the following is a full, clear, and exact description thereof.

The object of my invention is to provide a gun or blasting powder of great strength, readily and economically made, and in its use requiring but ordinary care. It consists in the composition formed substantially as hereinafter described.

To prepare the compound, take, in pulverized form, of prussiate of potash, one ounce, troy; of white sugar, one ounce, troy; of stone, preferably lime or soap stone, one ounce, troy. Mix these thoroughly in a suitable vessel, and then add of chlorate of potash, three ounces, troy, and of tannin, one pennyweight. Mix all thoroughly in a suitable vessel, and moisten with water to the consistency of dough. The powder is then grained by pressing it through an ordinary sieve, and afterward dried in any convenient manner, preferably in the open air, when it is ready for use.

I do not desire to be limited to the precise order of preparation above set forth. If preferred, all of the ingredients can be mingled at one and the same time. It is, however, much safer to combine, as described, a portion of the stone with the prussiate of potash before adding the chlorate of potash. The sugar is also preferably mixed with prussiate of potash at that stage of the process, to enable the chlorate of potash to readily unite with the prussiate of potash. The last-mentioned ingredient (tannin) is not essential to render the compound explosive. It is added to enable the compound to granulate.

The above-mentioned compound, being composed of ordinary articles of commerce, and not involving in its manufacture the use of special machinery, or the application of heat, can be readily and cheaply prepared with ordinary care and skill. In its use, it is employed in the same way as ordinary gunpowder, and is ignited in a similar manner.

I do not confine myself to the precise proportions of the ingredients herein mentioned, as I may perhaps vary the same, according to the quality of the powder desired, and the use for which it is intended.

Having thus fully described my invention, what I claim as new, and desire to secure by Letters Patent, is—

The within-described compound for gunpowder, consisting of the ingredients substantially as set forth.

In testimony that I claim the foregoing I have hereunto set my hand this 27th day of April, 1874.

JOHN HENRY DOLDE.

Witnesses:
C. M. ALEXANDER,
J. M. MASON.